United States Patent
Oliver

(10) Patent No.: US 9,575,838 B2
(45) Date of Patent: Feb. 21, 2017

(54) METHOD AND APPARATUS FOR IMPLEMENTING CHANGES WITHIN A DATA SYSTEM

(71) Applicant: Basis Technologies International Limited, Richmond, Surrey (GB)

(72) Inventor: Craig Douglas Oliver, Surrey (GB)

(73) Assignee: BASIS TECHNOLOGIES INTERNATIONAL LIMITED, Surrey (GB)

( * ) Notice: Subject to any disclaimer, the term of this patent is extended or adjusted under 35 U.S.C. 154(b) by 216 days.

(21) Appl. No.: 14/458,827

(22) Filed: Aug. 13, 2014

(65) Prior Publication Data

US 2015/0082086 A1   Mar. 19, 2015

(30) Foreign Application Priority Data

Aug. 13, 2013   (GB) .................................. 1314506.5

(51) Int. Cl.
  *G06F 11/00* (2006.01)
  *G06F 11/14* (2006.01)
  *G06F 9/44* (2006.01)

(52) U.S. Cl.
  CPC ............ *G06F 11/1435* (2013.01); *G06F 8/71* (2013.01); *G06F 11/1402* (2013.01); *G06F 11/1451* (2013.01); *G06F 11/1471* (2013.01)

(58) Field of Classification Search
  CPC ................................................. G06F 11/1435
  See application file for complete search history.

(56) References Cited

U.S. PATENT DOCUMENTS

| | | | |
|---|---|---|---|
| 6,438,749 B1 | 8/2002 | Chamberlain | |
| 7,272,600 B1 | 9/2007 | Singh | |
| 9,158,633 B2 * | 10/2015 | Bish | .................... G06F 11/1451 |
| 2003/0126159 A1 | 7/2003 | Nwafor | |
| 2004/0103340 A1 | 5/2004 | Sundareson et al. | |
| 2007/0006208 A1 | 1/2007 | Nguyen | |
| 2008/0114771 A1 | 5/2008 | Welingkar | |
| 2008/0155526 A1 | 6/2008 | Gokhale | |

(Continued)

OTHER PUBLICATIONS

Wim Van Den Wyngaert, "Transport Request Backout/Rollback", online discussion from SAP Community Network, post dated Feb. 2010, 12:02:PM; URL: http://scn.sap.com/thread/1368280, retrieved Jan. 14, 2014.

(Continued)

*Primary Examiner* — Christopher McCarthy
(74) *Attorney, Agent, or Firm* — Gottlieb, Rackman & Reisman, PC

(57) ABSTRACT

The present invention provides a method of and apparatus for implementing changes within a data system. The method receiving a request including one or more objects to be imported into a data system, creating a back up request comprising a copy of the objects included within the request, implementing the back up request in the system to generate a modified back up request including a log of the objects modified in the request, storing the modified back up request. This allows a log of changes to objects in the data system to be generated using a copy of a request including a list of changes to the objects. Once the modified back up request has been generated the request may be imported into the system.

9 Claims, 5 Drawing Sheets

(56) References Cited

U.S. PATENT DOCUMENTS

2015/0370654 A1* 12/2015 Bish .................... G06F 11/1451
714/19

OTHER PUBLICATIONS

UK Search Report for Corresponding/Priority Application GB1314506.5.
EP Search Report for corresponding EP application No. 14180810 dated Jan. 23, 2015.

* cited by examiner

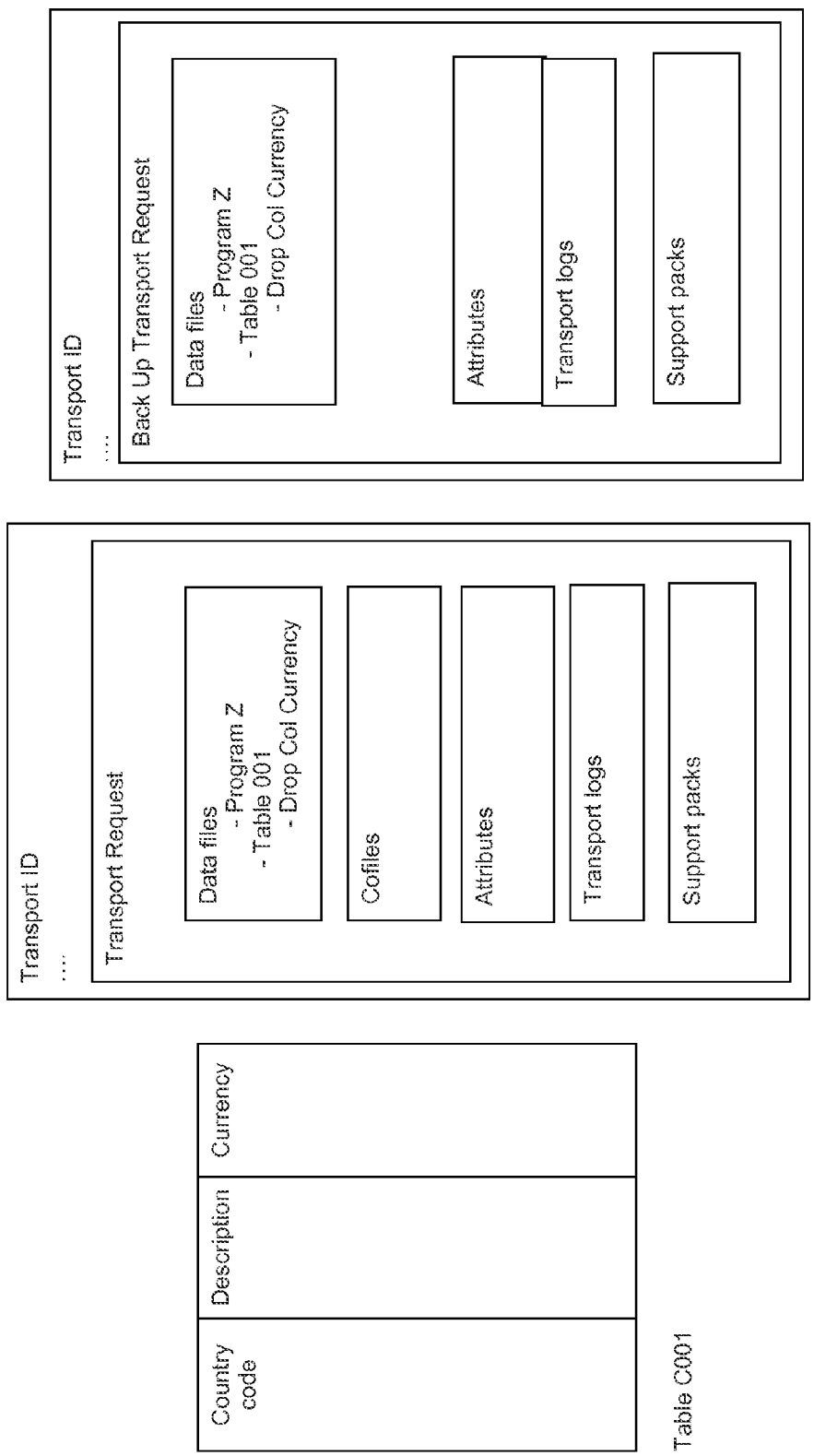

METHOD AND APPARATUS FOR IMPLEMENTING CHANGES WITHIN A DATA SYSTEM

This application claims priority from GB Application Serial No. 1314506.5 filed Aug. 13, 2013 and incorporated herein by reference.

FIELD OF THE INVENTION

A method of implementing changes within a data system to enable restoration of a system to the state it was in prior to implementation of the change. The method is particularly applicable to a method of implementing changes within an SAP™ system.

BACKGROUND

Within an enterprise data system such as that designed by SAP™ development of that system continuously occurs, for example to solve problems within the system or to enable additional functionality. However, as enterprises are responsible for interacting with large numbers of people the implementation of changes are tightly controlled in order to mitigate the risk of any undesirable changes being introduced into the system.

The current method of implementing change within a data system involves the use of three different systems, a development system, a test system and a production system as illustrated in FIG. 1. In the development system changes to objects in the system are developed by programmers. Once a change has been sufficiently developed it is moved into the test system which mirrors the system that is used by the employees of the enterprise as far as possible. In the test system any effects of the change can be identified. If any further development is required occur to overcome issues which are identified in the test system then the transport request is rejected and returned to the development system for further development. Once, sufficient testing has occurred the changes can be imported into the "production system" which is the system used by employees of the enterprise to perform their day to day tasks.

In order to ensure that all of the data and objects related to a particular development are transported together an element called a transport request is used to move new features from one system to the next. When a transport request is created the developer adds objects to the transport request. When an object is added to the transport request any related development objects and categories are also added to the transport request an example of such a Transport Request is illustrated in FIG. 2. In a transport request five different types of files can be found, these are: data files which contain the data to be transported; cofiles which contain the different steps of the request; profile files which contain profile parameters, a transport log which contains logs, trace files and statistics; and support packs which contain update and enhancement related files.

It is important that this process is tightly controlled as, once a change is imported into the production system, the production system cannot automatically be returned to its previous state but rather a further transport request must be produced and developed to reverse the changes. This takes time and therefore is undesirable if a critical issue such as a function required for a commonly used business transaction no longer being operational, has been introduced into the production system.

Therefore what is required is an improved method for controlling the production system when a change is imported into it.

SUMMARY OF THE INVENTION

According to an aspect of the present invention there is provided a system including a data store and a processor configured to, upon receiving a request including one or more objects to be imported into the system, perform the steps of: creating a back up request comprising a copy of the objects included within the request as they are present in the system at the time the back up request is created; and storing the back up request. The processor is configured to identify a backup request implementing a change to an object in the system, the reversal of which may involve a loss of information and, upon identifying the backup request, generate an alert to a user. The alert may be a visual alert displayed on a display.

The processor may be configured to generate the alert when it is determined that reversal of the backup request will result in a loss of information.

By creating a copy only of the objects that are to be changed by a request the present invention enables a database including a large number of objects to be quickly and efficiently backed up. Additionally, it allows the system to be reverted to its previous state quickly and efficiently as only the objects which were modified by the request are altered.

After creating a back up request, the request may be imported into the system causing the system to be amended by importing the one or more objects.

In response, to an input to reverse the request, the objects that were copied in the back up request may be reimported into the system.

The request may include an identifier for the back up request. Alternatively, the back up request includes an identifier of the request. This enables the corresponding back up request to be quickly identified enabling reversal of any change that has unwanted consequences.

The back up request may be deleted after a predetermined length of time.

Optionally, a request implementing a change to an object no version history is stored, in the data system and, upon identifying a request implementing a non-reversible change, generating an alert and, optionally, causing the alert to be displayed on a display. The change may be non-reversible. A change that is non-reversible, for example, where no version history is stored of the contents of the object, cannot be reversed by the system as no previous versions are stored and there is no record of the previous state of the object data. An example of such a non-reversible change in an SAP system is the creation, update or deletion of data in a table.

The processor is configured to identify a backup request implementing a non-reversible change to an object in the data system and, upon identifying a backup request implementing a non-reversible change, generating an alert and, optionally, causing the alert to be displayed on a display. This allows a user to be informed that the restoration may not include all of the data required for a complete restoration and enable them to ensure that all of the relevant data is entered. For example, if the non-reversible change is a deletion of a column although the restoration will allow a user to be aware that the column is not going to be populated with data and, if necessary, repopulate the restored column.

According to another aspect of the present invention there is provided a method, in a system including a data store and a processor. The method includes receiving a request including one or more objects to be imported into the system, creating a back up request comprising a copy of the objects included within the request as they are present in the system at the time the back up request is created and storing the backup request. The method also includes identifying a backup request implementing a change to an object in the system, the reversal of which may involve a loss of information and, upon identifying the backup request, generating an alert to a user, which may be displayed on a display.

After creating the back up request, the request can be imported into the system causing the system to be amended by importing the one or more objects.

In response to an input to reverse the request, the objects comprising the back up request may be imported into the system.

According to a further aspect of the present invention there is provided a computer program embodied on a computer readable medium which, when executed on a processor in a data system causes the processor to: upon receiving a request including one or more objects to be imported into the system; create a backup request comprising a copy of the objects included within the request as they are present in the system at the time the back up request is created; store the backup request; and identify a backup request implementing a change to an object in the system, the reversal of which may involve a loss of information and, upon identifying the backup request, generate an alert to a user, which may be displayed on a display.

BRIEF DESCRIPTION OF THE FIGURES

FIG. 5 illustrates a table in the data system;

FIG. 6 illustrates a transport request which implements a change to the table of FIG. 5; and FIG. 7 illustrates a back up transport request for the transport request of FIG. 6.

DETAILED DESCRIPTION

Figure 3:
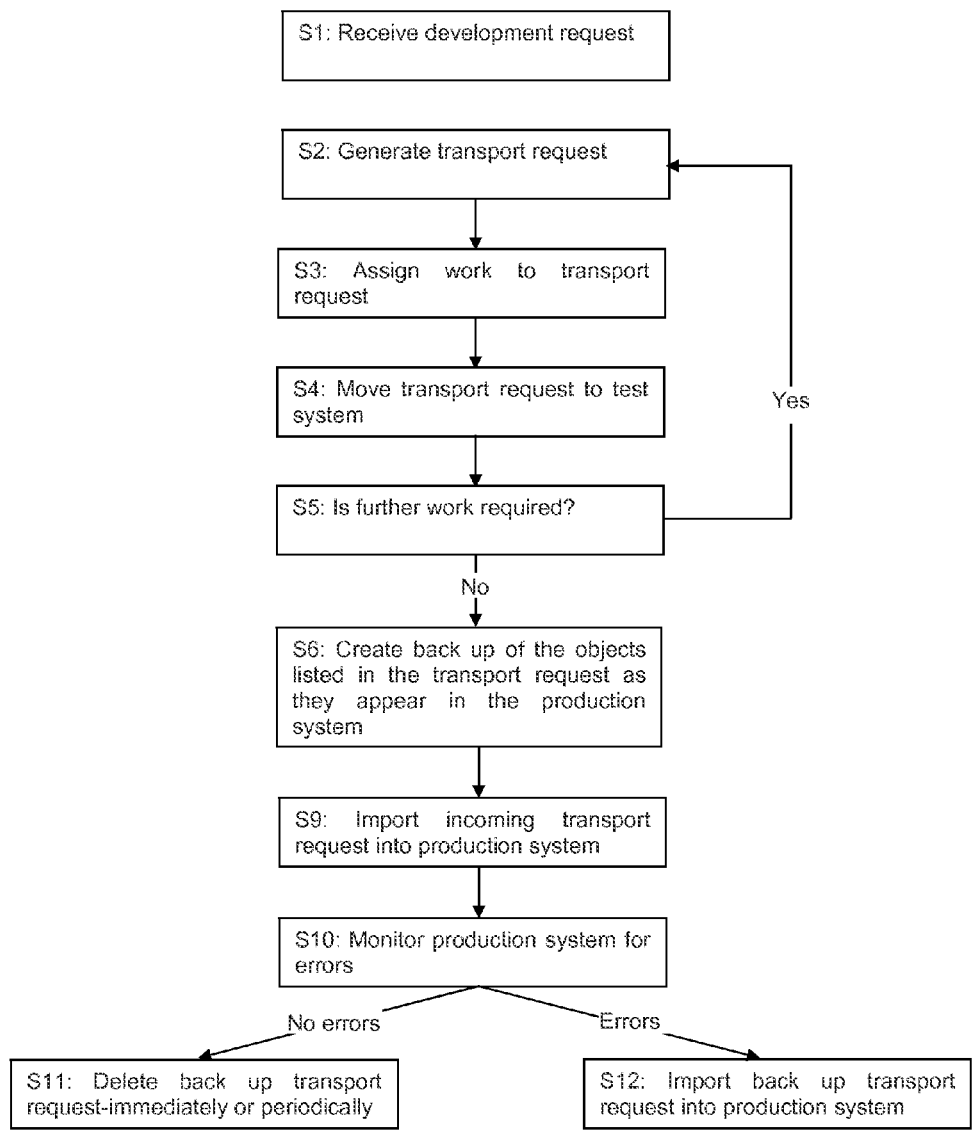
FIG. 3 is a flow diagram of a method according to the present invention.

A method of the present invention will now be described with reference to FIG. 3. This method is suitable for implementation in any suitable data system and, in particular, may be implemented in a SAP™ system such as the system described in UK patent application no 1309320.8 which is incorporated herein by reference. The steps performed by the system when developing and implementing changes in the data system are as follows:

S1: A development request for the system is received.

S2: A transport request is created within the development system.

Figure 1:
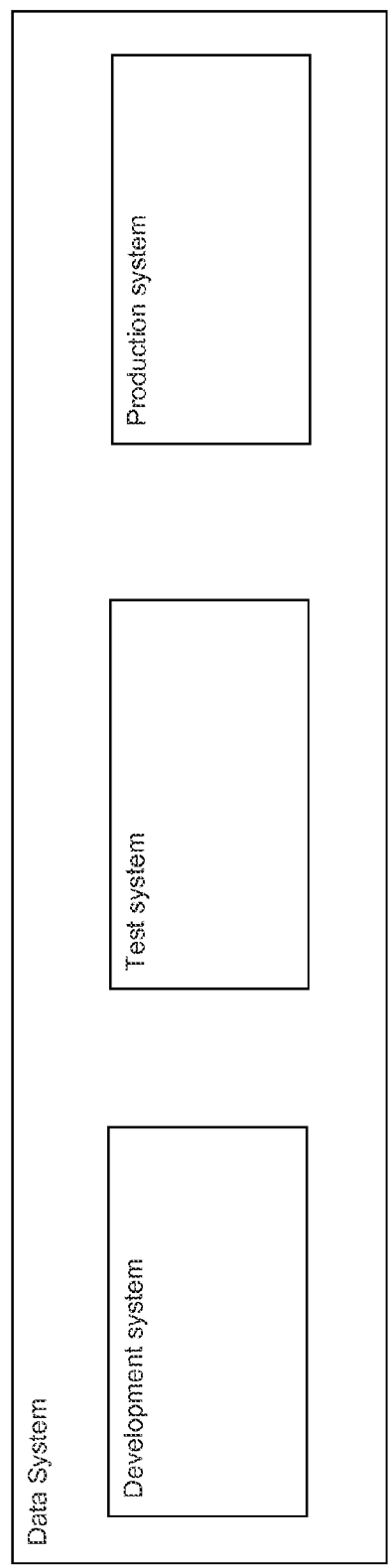
FIG. 1 illustrates a data system in which the present invention may be implemented.
Figure 2:
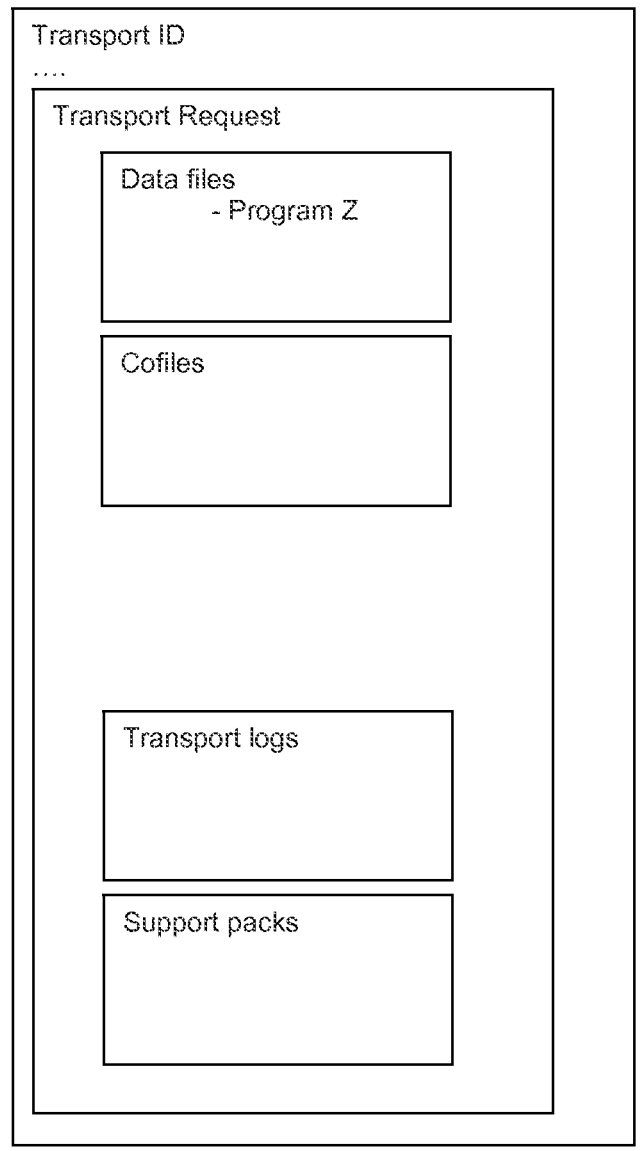
FIG. 2 illustrates a transport request.

S3: As work is done in response to the development request it is assigned to the transport request so that the transport request includes all of the data, parameters, and all of the steps required by the request. An example of a transport request is illustrated in FIG. 2. In FIG. 2 the data files include program Z which is a program to be imported into the system and the objects included in the co-files folder of the transport request include a new function of reporting program Z.

S4: Once the work has been completed the transport request is moved into the test system and implemented.

S5: In the test system the need for further changes to the code included in the transport request can be identified. If further changes are required then the transport request is passed back to the development system for further work. If no further changes are required the transport request can be imported into the production system.

Figure 4:
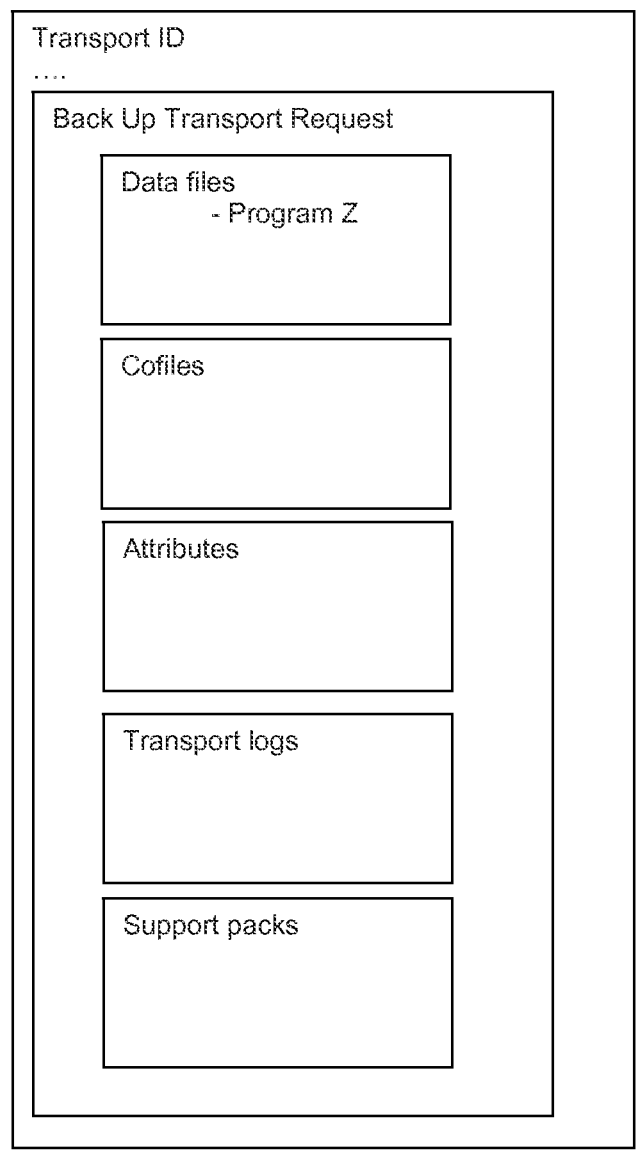
FIG. 4 illustrates a back up transport request.

S6: Before the transport request is imported into the production system a back up of objects within the production system that will be altered by the transport request is created. This may be created, for example using a back up transport request as illustrated in FIG. 4. A back up transport request is a copy of the objects as listed in the data section of the transport request as they appear in the production system immediately prior to the importation of the transport request. The back up transport request is released from the production system. This results in a copy of all of the objects being stored in the data file of the backup transport request. This execution is recorded in the logs contained within the transport request. The executed back up transport request is stored with a link to the original transport request. This link may be any suitable link, for example, the back up transport request may be amended to include an identifier of the transport request.

S7: The transport request is imported into the production system.

S8: The system is monitored for errors.

S9: If no errors occur in the system as the result of the implementation of the transport request then the back up transport request can be deleted after a predetermined period of time.

S10: If errors occur within the system then the back up transport request is imported back into the system. When the backup transport request is imported into the system the objects are restored to their previous state and all newly created objects are deleted.

In this way the changes imported into the system in the transport request are reversed. The imported changes may change the structure of objects within the system and add new objects to the system.

Broadly, methods and apparatus disclosed herein may relate to identifying a backup request implementing a change to an object in the system, the reversal of which may involve the loss of information. A back up request implementing a change to an object in the system, the reversal of which may involve the loss of information encompasses a SAP instruction implementing a change that can only be undone with loss of data. That is, the change may be reversed, but the system is degraded as a result, for example by data being lost. In particular exemplary methods and apparatus, the backup request will only result in a loss of information in a number of specific scenarios.

The term "information" as referred to herein encompasses data stored in any objects within a SAP system. The data may relate to the structure of one or more objects in a SAP system. The data may comprise entries made within objects stored within a SAP system. For example, information as referred to herein relates to information associated with a SAP system or any of the contents of a SAP system.

A loss of information as referred to herein relates to any information that is lost from an SAP system that cannot be retrieved. A loss of information may specifically refer to information that is lost from a SAP system and that cannot be retrieved by either a transport request or a backup transport request. An example of a loss of information would be manual entries of data that have been added to an object in a SAP system and then deleted, wherein the entries of data have not been stored elsewhere in the SAP system.

An example of a change which might be imported in a transport request and the reversal of which may result in a loss of information is the deletion of a column within a table. SAP has 3 different types of database tables—(1) Configuration, (2) Master data and (3) Transactional data. Configuration data is "customising" that each specific client has when they implement SAP. It might define things like payment methods, customer segments, company codes etc. Exemplary configuration tables have single digits of rows, dozens of rows up to hundreds of rows at an upper end. Configuration tables rarely change since they control how the system functions. In fact, configuration database tables typically only change via transport requests.

The second type of database table, master data, comprises tables like customer records, vendor records, etc. that change occasionally bit but not excessively. Master data tables typically change more frequently than configuration database tables. Small numbers of customers/vendors might be created each day depending on industry and implementation of the system. Typically, master data database tables might have thousands to tens of thousands of records in them.

The last type of database table, transactional data, comprises data such as sales orders, meter readings, billing documents etc. Typically, there are thousands, tens of thousands to hundreds of thousands of records being created/updated every day in these tables. Typically, both master data and transactional data tables are updated (rows created, changed, deleted) not by transport requests but by users and automated business processes running in the system through-out the day. Transport requests might be used to change the structure of master data and transactional data database tables, but generally not their contents.

When a transport request changes a configuration table, a back-up of all of the entries in that table prior to importing the new transport request is typically undertaken. Not only will the structure (fields) of the table be backed up, but also the contents. In this way, if the change is reversed then the previous entries will be added back into the table such that there is no data loss.

However, it is often not possible or infeasible do to backup all of the data each time for master or transactional tables because the amount of data is very high. Typically, if a transport request is applied that removes a column on one of those tables the data would not be backed up for restoring the data in the column that is reinstated after deployment of a back-up request.

Exemplary methods and apparatus disclosed herein are for use on database tables when no back-up of data is undertaken. This may be because it is not possible or infeasible to back-up the data, for example, due to high data volumes. Exemplary methods and apparatus disclosed herein may be used with master data and transactional data database tables.

For example, a production system may include a table C001 as illustrated in FIG. 5, which may be a master data or transactional data database table. C001 has three columns, namely Country Code, Description and Currency. A transport request as illustrated in FIG. 6 includes an entry requesting, that for C001, the currency column is deleted. A back up request is generated and implemented in the production system. After its implementation in the production system the transport request appears as illustrated in FIG. 7. Thus, it can be seen in the back up transport request the structure of C001 is stored.

Before the transport request is imported into the production system, a backup transport request can be created. The backup transport request may comprise a copy of the state of objects in the production system prior to implementation of the transport request. In the example of C001, the backup transport request would include a copy of the structure of the table as it appeared in the production system prior to the transport request being imported (i.e. the table including the Currency column). The back up transport request may be created in the production system. After it is created, the backup request would appear as illustrated in FIG. 7. Thus, as can be seen in FIG. 7, the structure of C001 is stored.

Although the previous structure of C001 is stored in the back up request, the data that is removed from the table during the implementation of the transport request may not be. In other words, the structure of C001 and the format of the currency column may be stored in the back up request, but the individual entries within the currency column may not be stored. By implementing the backup request in the production system after the transport request has been imported to the system, the original structure of C0001 may be restored. It may not be possible to reinstate the data that once populated the currency column using the back up request.

In other embodiments, the backup transport request may store data included in objects as well as the structure of the objects themselves.

A similar problem may arise in the opposite direction. That is, a backup request may result in a loss of information. The information that is lost may not be able to be obtained from an original transport request.

To elaborate on this point by way of example, a transport request which alters the structure of a table by the addition of a column may be imported into a production system. The transport request may also include provisions for data to be added to the new column. In addition or alternatively, data may be manually entered into the column of the table in question by an employee. A variety of other manual or automatic processes may populate the column. If the backup request is then subsequently imported into the production system, this will reverse the changes made to the table accordingly. The column that was added to the table according to the earlier transport request will be deleted in the production system. The data in the added column will also be deleted in the production system.

It may be possible to reverse changes to the table resulting from the implementation of the backup request. By once again importing the transport request into the production system, it may be possible to reinstate the additional column into the table. However, it may not be possible to reinstate any data that has been added to the additional column of the table in-between the first implementation of the transport request and the implementation of the backup request. In this scenario, although a change resulting from the implementation of a transport request or a backup transport request may be reversible to an extent, there may be certain repercussions from implementing certain transport requests. These repercussions primarily involve the loss of information from the production system.

The system may be configured to detect when a transport request or back up transport request involves the implementation of a change where the structure of one or more objects in the production system is altered. Further, the system may be configured to detect where a change in structure to an object potentially involves the loss of information contained within the object or in connection with the object. In exemplary methods and apparatus, the system may determine when a transport request is to be executed on a master data or transactional data database and/or when it is not possible or infeasible to back up data in a table before a transport request is executed, for example because the volume of data is too great to be stored.

In the event that such a change is detected in a transport request, the system may generate an alert to a user before implementing the transport request. Further, the system may generate an alert to the user before importing a backup transport request if it involves the change to the structure of one or more objects.

In addition or alternatively, the system may generate alerts to the user where any transport or back up transport request is to be imported into the production system and the request involves a change to the structure of one or more objects which may lead to a loss of information.

Additionally, such alerts may allow the user to choose not to import a transport request of a back up transport request into the production system. The alerts may be visual on a display, but may take any other suitable form. For example, the alert may be auditory or physical, such as through vibration.

Although the previous structure of the table is stored the data that is removed from that table by deleting the currency column is not stored. Optionally, the system may be configured to detect when a transport request includes a configuration change where the structure of an object is altered. Examples of a configuration change include a deletion of a column in a table. In the event that a configuration change is detected the system may generate an alert to the user before implementing the transport request. Further the system may additionally, or alternatively, generate an alert to the user before importing a backup transport request to reverse a transport request where a configuration change has occurred. This will alert the user to the fact that data may have to be input into the object. For example, the alert may indicate to the user that the column currency is being restored to Table 001. Additionally, such an alert allows a user to choose not to import the backup transport request into the data system. Further, the data of the configuration table may be stored within the backup transport request so that after reversing out the structural column change, the data within that table can also be restored.

Examples of other objects that might be included within a transport request are: programs, data elements, structures, tables, functions.

Although the back up transport request has been described as being linked to the transport request by including an identifier for the transport request in the back up transport request it is clear that any suitable method may be used to link the transport request and back up transport request. For example, the system may be provided with a table which stores transport request identifiers in association with the identifier for their related back up transport request or the identifier of the back up transport request may be added to the transport request. The identifier of the back up transport request or transport request may be stored for example, as an attribute of the transport request.

The invention claimed is:

1. A System Analysis and Program Development, SAP, system including a database and a processor configured to, upon receiving a transport request including one or more objects to be imported into the system, perform the steps of:

creating a back up transport request comprising a copy of the objects included within the transport request as they are present in the database of the system at the time the back up transport request is created;

storing the back up transport request, wherein the processor is configured to identify a back up transport request implementing a change to an object in the database where there is no record of the previous state of the object, and the importation of which may involve a loss of information and, upon identifying the back up transport request, generate an alert to a user.

2. A system as claimed in claim 1 wherein the processor is further configured to, after creating a back up transport request, import the transport request into the system causing the database of the system to be amended by importing the one or more objects.

3. A system as claimed in claim 2 wherein, in response to an input to reverse the transport request, the processor imports the back up transport request comprising the objects into the system.

4. A system as claimed in claim 1 wherein the transport request includes the identifier of the back up transport request and/or the back up transport request includes an identifier of the request.

5. A system as claimed in claim 1 wherein the back up transport request is deleted after a predetermined length of time.

6. A system as claimed in claim 1 wherein the processor is configured to identify a transport request implementing a change to an object in the database where no version history is stored in the data system and, upon identifying the transport request, generate an alert to a user.

7. A method for use in a System Analysis and Program Development, SAP, system including a database and a processor comprising:

receiving a transport request including one or more objects to be imported into the system;

creating a back up transport request comprising a copy of the objects included within the request as they are present in the database of the system at the time the back up transport request is created;

storing the backup transport request; and identifying a backup transport request implementing a change to an object in the database where there is no record of the previous state of the object, and the importation of which may involve a loss of information and, upon identifying the back up transport request, generating an alert to a user.

8. A method as claimed in claim 7 wherein, after creating the back up transport request, the method comprises importing the transport request into the system causing the database of the system to be amended by importing the one or more objects.

9. A method as claimed in claim 7 further comprising, in response to an input to reverse the transport request, importing the back up transport request comprising the objects into the system.

* * * * *